(12) United States Patent
Hou

(10) Patent No.: US 7,290,462 B2
(45) Date of Patent: Nov. 6, 2007

(54) BICYCLE TWIST-GRIP SHIFT CONTROL DEVICE WITH PARALLEL GEARING

(75) Inventor: Tang Foo Hou, Singapore (SG)

(73) Assignee: Shimano, Inc., Sakai, Osaka (JP)

( * ) Notice: Subject to any disclaimer, the term of this patent is extended or adjusted under 35 U.S.C. 154(b) by 560 days.

(21) Appl. No.: 10/604,698

(22) Filed: Aug. 11, 2003

(65) Prior Publication Data
US 2005/0034554 A1    Feb. 17, 2005

(51) Int. Cl.
*G05G 1/08* (2006.01)
(52) U.S. Cl. ....................................... 74/507
(58) Field of Classification Search ............... 74/501.6, 74/504, 505, 507, 502.2, 489, 511 R, 527, 74/530
See application file for complete search history.

(56) References Cited

U.S. PATENT DOCUMENTS

| | | | |
|---|---|---|---|
| 4,352,303 A | | 10/1982 | Christner |
| 5,315,891 A | * | 5/1994 | Tagawa ...................... 74/489 |
| 5,588,331 A | | 12/1996 | Huang et al. |
| 5,732,598 A | | 3/1998 | Shoge et al. |
| 5,862,709 A | * | 1/1999 | Kageyama ................... 74/489 |
| 5,921,139 A | | 7/1999 | Yamane |
| 6,276,227 B1 | | 8/2001 | Ose |
| 6,389,925 B1 | | 5/2002 | Ose |
| 6,467,368 B1 | | 10/2002 | Feng et al. |
| 6,718,844 B2 | * | 4/2004 | Hanatani ................... 74/502.2 |
| 2002/0112559 A1 | | 8/2002 | Liu |
| 2002/0128112 A1 | * | 9/2002 | Hanatani ..................... 475/349 |

FOREIGN PATENT DOCUMENTS

| | | |
|---|---|---|
| DE | 3601921 A1 | 7/1987 |
| DE | 4026058 A1 | 2/1992 |

* cited by examiner

*Primary Examiner*—Richard Ridley
*Assistant Examiner*—Matthew A. Johnson
(74) *Attorney, Agent, or Firm*—James A. Deland

(57) ABSTRACT

A bicycle twist-grip shift control device includes a base member for attachment to the bicycle; a twist-grip operating member rotatably supported relative to the base member for rotating in first and second directions around an operating member axis; a transmission control member rotatably mounted relative to the base member for controlling the pulling and releasing of a transmission control element in response to rotation of the operating member, and an intermediate member that moves in a direction of an intermediate member axis in response to rotation of the operating member. The transmission control member rotates around a transmission control member axis that is substantially parallel to the operating member axis, and the intermediate member includes an intermediate member detent for maintaining a rotational position of the operating member and the transmission control member.

13 Claims, 6 Drawing Sheets

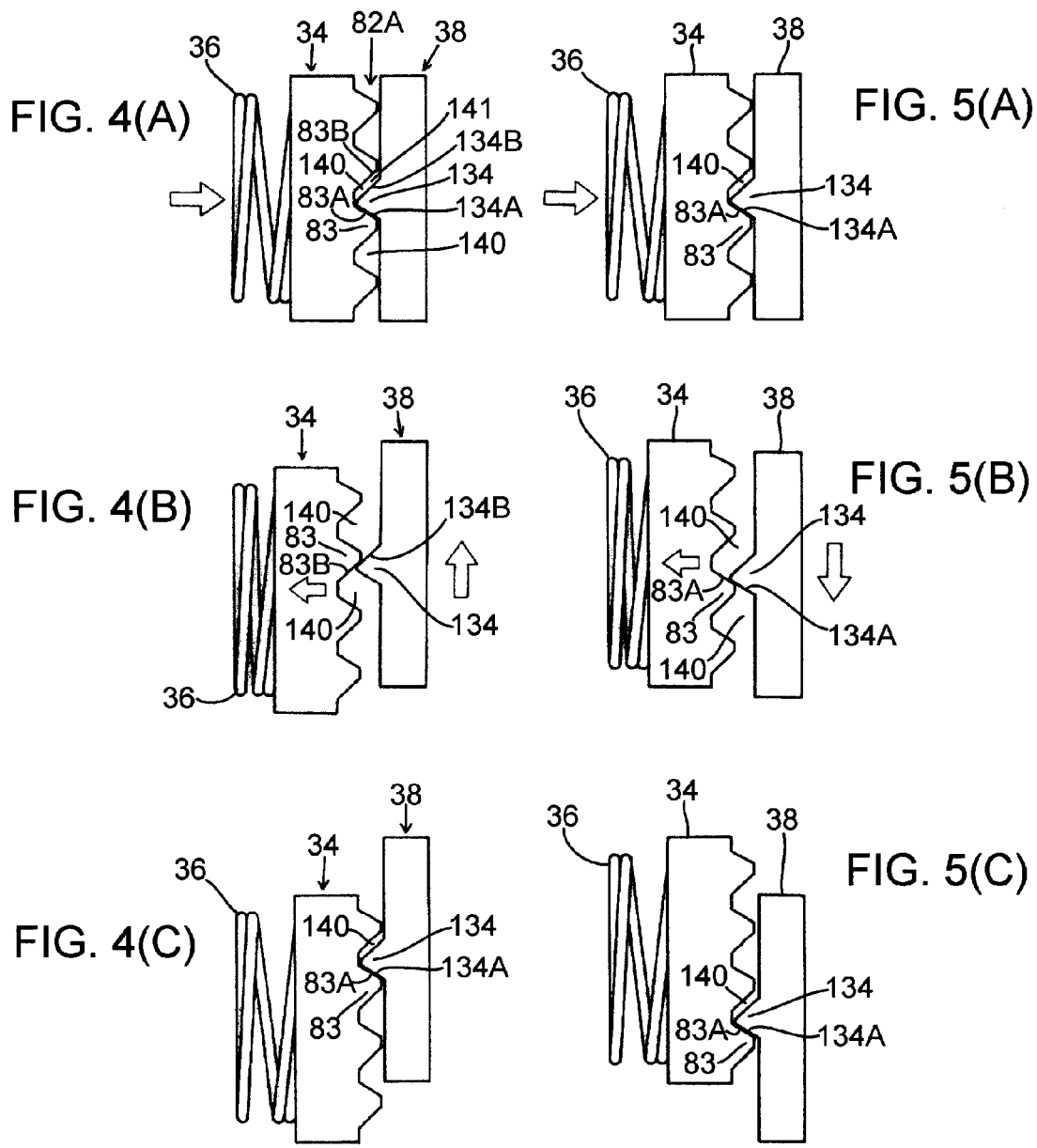

US 7,290,462 B2

BICYCLE TWIST-GRIP SHIFT CONTROL DEVICE WITH PARALLEL GEARING

BACKGROUND OF INVENTION

The present invention is directed to bicycles and, more particularly, to a bicycle twist-grip shift control device that uses parallel gearing to communicate rotational power from a twist-grip to a transmission control element.

Twist-grip shift control devices have been used with bicycles to pull and release transmission control elements in response to rotation of a twist-grip operating member that rotates coaxially with a handlebar axis. An example of such a device is shown in U.S. Pat. No. 5,315,891. The device disclosed in that patent includes a twist-grip operating member that rotates coaxially around a handlebar axis, a drive gear that rotates coaxially with the operating member, a driven gear that meshes with the drive gear and rotates around an axis that is parallel to the handlebar axis, and a cable reel that rotates coaxially with the driven gear for winding and unwinding a transmission control cable. The operating member rotates in clockwise and counterclockwise directions from a home position to correspondingly rotate the cable reel. A retainer mechanism maintains the cable reel in the selected position so that the operating member may return to the home position after each operation.

SUMMARY OF INVENTION

The present invention is directed to various features of a bicycle twist-grip shift control device. In one embodiment, a bicycle twist-grip shift control device comprises a base member for attachment to the bicycle; a twist-grip operating member rotatably supported relative to the base member for rotating in first and second directions around an operating member axis; a transmission control member rotatably mounted relative to the base member for controlling the pulling and releasing of a transmission control element in response to rotation of the operating member, and an intermediate member that moves in a direction of an intermediate member axis in response to rotation of the operating member. The transmission control member rotates around a transmission control member axis that is substantially parallel to the operating member axis, and the intermediate member includes an intermediate member detent for maintaining a rotational position of the operating member and the transmission control member. Additional inventive features will become apparent from the description below, and such features alone or in combination with the above features may form the basis of further inventions as recited in the claims and their equivalents.

BRIEF DESCRIPTION OF DRAWINGS

FIGS. 4(A)-4(C) show the operation of the twist-grip shift control device when pulling a transmission control element;

FIGS. 5(A)-5(C) show the operation of the twist-grip shift control device when releasing the transmission control element;

DETAILED DESCRIPTION

Figure 1:
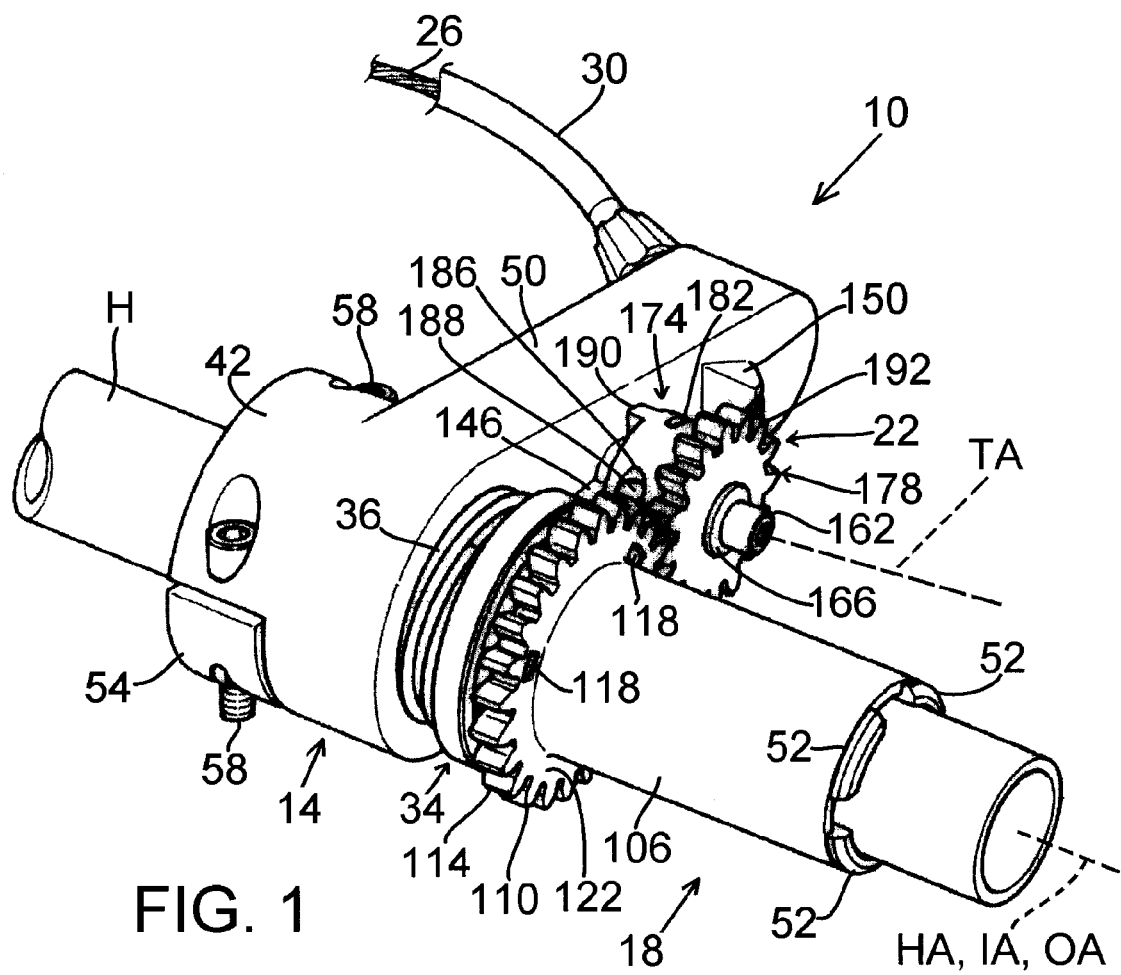
FIG. 1 is an oblique view of a particular embodiment of a twist-grip shift control device showing relevant operating components.
Figure 2:
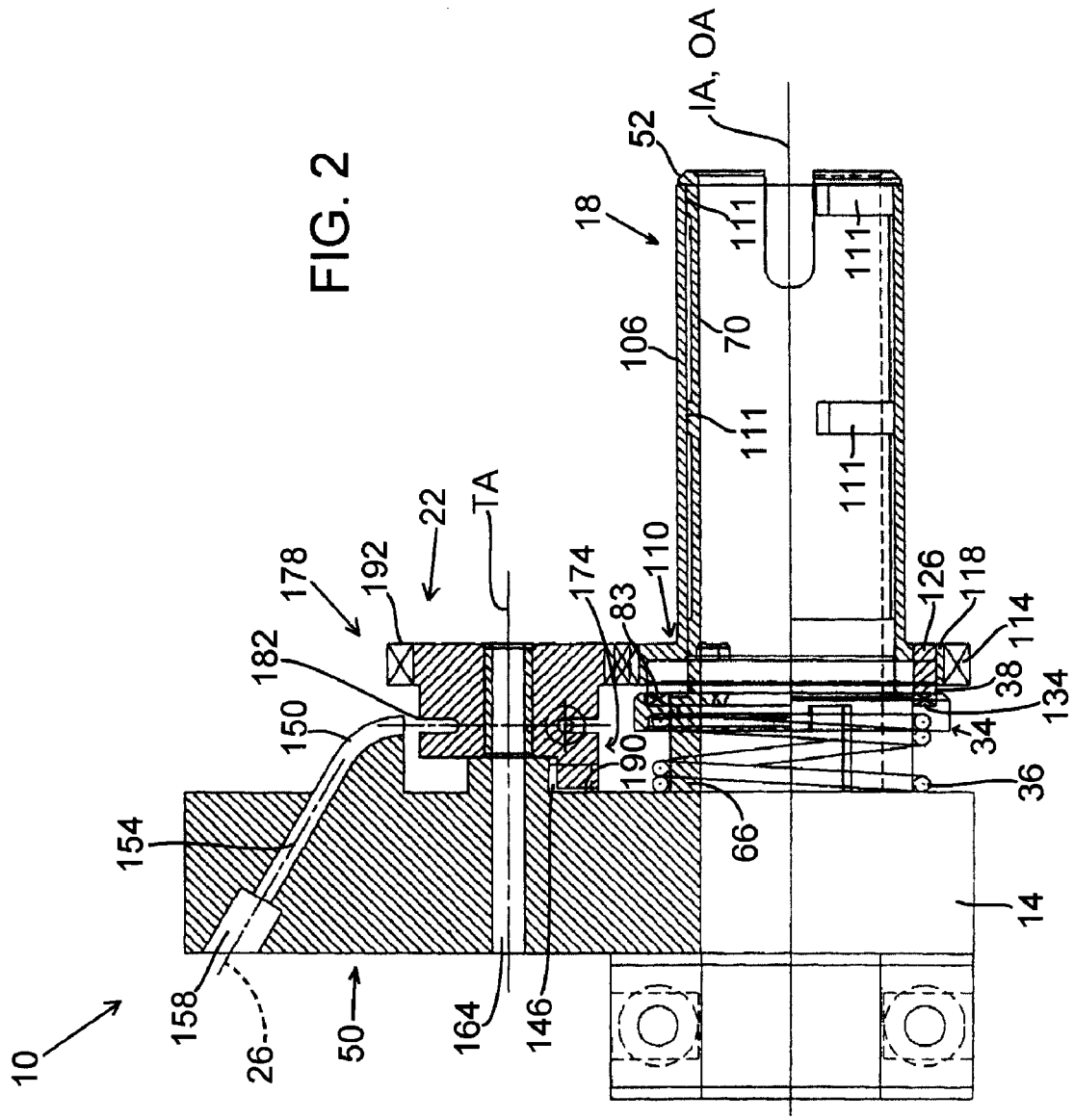
FIG. 2 is a cross-sectional view of the twist-grip shift control device.
Figure 3:
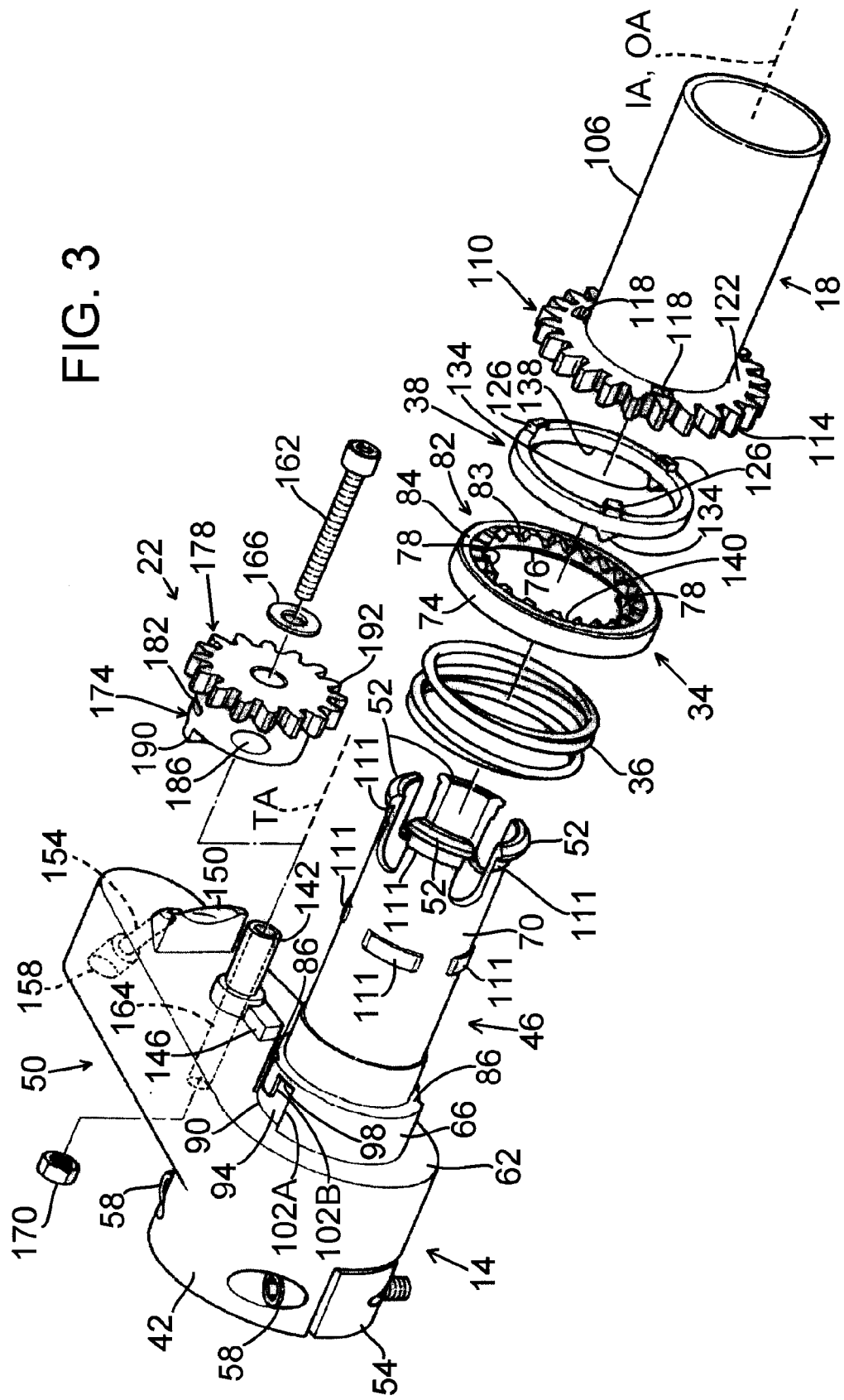
FIG. 3 is an exploded view of the twist-grip shift control device.

FIGS. 1-3 are oblique, cross sectional and exploded views, respectively, of a particular embodiment of a twist-grip shift control device 10 showing relevant operating components. In this embodiment, twist-grip shift control device 10 comprises a base member 14 adapted to mount twist-grip shift control device 10 to a portion of a bicycle such as a handlebar H having a handlebar axis HA; a twist-grip operating member 18 rotatably supported relative to the base member 14 for rotating in first and second directions around an operating member axis OA; a transmission control member 22 mounted for rotating relative to the base member 14 around a transmission control member axis TA in response to rotation of the operating member 18; an intermediate member 34 mounted for moving in a direction of an intermediate member axis IA; a bias spring 36 disposed between intermediate member 34 and base member 14; and a ring-shaped operating member detent unit 38 disposed between operating member 18 and intermediate member 34. Transmission control member 22 controls the pulling and releasing of a transmission control element such as a transmission control wire 26 that slides within an outer casing 30. Transmission control wire 26 may be connected to a suitable transmission such as an internal hub transmission, a derailleur, or some other transmission. In this embodiment, both the operating member axis OA and the intermediate member axis IA is coaxial with the handlebar axis HA, and the transmission control member axis TA is parallel to and spaced apart from the operating member axis OA, the intermediate member axis IA and the handlebar axis HA. Of course, the foregoing features may be altered in other embodiments. One or more covers (not shown) may be used to partially or completely cover the various components for aesthetic purposes.

As shown more clearly in FIG. 3, base member 14 includes a base member mounting portion 42, an operating/intermediate member mounting portion 46, and a transmission control member mounting portion 50. Base member 14 may be fixed to handlebar H by clamping handlebar H between base member mounting portion 42 and a mounting saddle 54 using screws 58 in a known manner. Operating/intermediate member mounting portion 46 has a generally cylindrical tubular shape, and it extends from a side wall 62 of base member mounting portion 42. Operating/intermediate member mounting portion 46 includes an intermediate member mounting portion 66 and an operating member mounting portion 70.

In this embodiment, intermediate member 34 comprises a ring-shaped intermediate member body 74, a pair of guide projections 78 that extend radially inwardly from an inner peripheral surface 76 of intermediate member body 74, and an intermediate member detent unit 82 comprising a plurality of trapezoid-shaped detent teeth 83 that extend circumferentially around an axially outer side 84 of intermediate member body 74.

Intermediate member 34 is mounted to intermediate member mounting portion 66 by initially placing bias spring 36 around intermediate member mounting portion 66, sliding guide projections 78 axially inwardly against the biasing force of bias spring 36 into a pair of diametrically opposed entry channels 86 formed on intermediate member mounting portion 66, rotating intermediate member 34 counterclockwise so that guide projections 78 slide circumferentially along a corresponding pair of diametrically opposed transition channels 90 (only one such transition channel is shown in FIG. 3), and then allowing the guide projections 78 to slide axially outwardly along a corresponding pair of diametrically opposed locking channels 94 (only one such locking channel is shown in FIG. 3) in accordance with the biasing force of bias spring 36. In this position, guide projections 78 are prevented from moving axially outwardly by a corresponding pair of diametrically opposed axial locking abutments 98 (only one such axial locking abutment is shown in FIG. 3) and are substantially rotationally locked in place by corresponding diametrically opposed pairs of rotation locking abutments 102A, 102B (only one such pair of rotational locking abutments is shown in FIG. 3), wherein rotation locking abutments 102A, 102B face each other in the circumferential direction. This configuration allows intermediate member 34 to slide a limited distance axially within locking channels 94 in the direction of the handlebar axis HA and operating member axis OA while being substantially nonrotatable relative to base member 14. In this embodiment, operating member 18 comprises a generally tubular handgrip portion 106 and an integrally mounted transmission control member drive portion 110, wherein handgrip portion 106 is mounted around operating member mounting portion 70 for rotation coaxially around handlebar axis HA and operating member axis OA. Bearing supports 111 are formed on operating member mounting portion 70 for providing additional bearing support to operating member 18. Retaining tabs 52 axially retain operating member 18 on operating member mounting portion 70 as shown in FIG. 1. Transmission control member drive portion 110 has the shape of a circular gear with a plurality of circumferentially disposed gear teeth 114. A plurality of (e.g., three) detent unit coupling structures in the form of coupling openings 118 are circumferentially disposed evenly around a side wall 122 of transmission control member drive portion 110 for engaging a corresponding plurality of operating member coupling structures in the form of coupling projections 126 that project from an axially outer side wall 130 of operating member detent unit 38 in the direction of operating member axis OA. Thus, operating member 18 rotates integrally with operating member detent unit 38.

Operating member detent unit 38 further includes a plurality of (e.g., three) evenly spaced triangular-shaped detent projections 134 that project from an axially inner side wall 138 of operating member detent unit 38 in the direction of operating member axis OA for engaging trapezoid-shaped spaces 140 between faces 83A and 83B (FIG. 4(A)) of adjacent pairs of detent teeth 83. Each detent projection 134 faces away from a corresponding coupling projection 126.

As shown in FIG. 4(A), the face 83A of each detent tooth 83 in this embodiment is steeper than its opposite face 83B, and the face 134A of each detent projection 134 is steeper than its opposite face 134B. That is because the bicycle transmission typically includes a return biasing mechanism that biases the control wire 26 in a direction to unwind control wire 26 from transmission control member 22. The return biasing mechanism thus causes operating member 18 and operating member detent unit 38 to be biased downwardly relative to intermediate member 34 in the view shown in FIG. 4(A). The steeper angles of faces 83A and 134A help to resist the force of the return biasing mechanism to maintain the position of operating member 18 and operating member detent unit 38 relative to intermediate member 34 and base member 14. The shallower faces 83B and 134B also facilitate the rotation of operating member 18 to wind the control wire 26 around transmission control member 22 in a manner described below.

In this embodiment, the circumferential width of each space 140 between the faces 83A and 83B of the corresponding pairs of detent teeth 83 is greater than the circumferential width of each detent projection 134 between its corresponding faces 134A and 134B. As a result, a compensating space 141 is formed between the face 134B of each detent projection 134 and the face 83B of its facing detent tooth 83. Compensating space 141 compensates for cumulative slack in the control wire 26 and the bicycle transmission, which also may accommodate overshifting the bicycle transmission in a manner and for purposes that is well known in the art.

Transmission control member mounting portion 50 includes a pivot post 142 with a rotation stopper 146; a wire guide ramp 150; a wire guide channel 154; and an outer casing terminating opening 158 for terminating outer casing 30. Transmission control member 22 is rotatably mounted around pivot post 142 and is retained to pivot post 142 by a screw 162, a washer 166 and a nut 170, wherein screw 162 extends through an opening 164 that passes through pivot post 142 and the body of transmission control member mounting portion 50.

Transmission control member 22 includes a wire winding drum 174 and a transmission control member driven portion 178. Wire winding drum 174 includes a wire winding groove 182 for winding transmission control wire 26, a wire terminating opening 186 for receiving a wire end bead 188 (FIG. 1) that is conventionally formed on the end of transmission control wire 26, and a rotation stopper 190 that engages rotation stopper 146 on pivot post 142 to limit the range of motion of transmission control member 22 relative to base member 14. Transmission control member driven portion 178 has the shape of a circular gear with a plurality of circumferentially disposed gear teeth 192.

FIGS. 4(A)-4(C) show the operation of twist-grip shift control device 10 when pulling transmission control wire 26. In the idle position shown in FIG. 4(A), operating member 18 and operating member detent unit 38 are biased downward relative to intermediate member 34 by the return biasing mechanism in the transmission. The face 134A of each detent projection 134 thus rests against the face 83A of a corresponding detent tooth 83, and operating member 18 and operating member detent unit 38 are held stationary relative to base member 14. The rider then rotates operating member 18 counterclockwise in FIG. 1 against the force of the biasing mechanism in the bicycle transmission. Detent projection 134 initially moves across compensating space 141 to compensate for the cumulative lost motion in control wire 26 and the bicycle transmission as mentioned above, and control wire 26 winds onto the wire winding groove 182 in wire winding drum 174 of transmission control member 22. Then, the face 134B of each detent projection 134 abuts against the face 83B of a corresponding detent tooth 83. Since intermediate member 34 is nonrotatably coupled to intermediate member mounting portion 66 of base member 14 but is capable of moving axially within locking channels 94, the face 134B of each detent projection 134 slides against the face 83B of its corresponding detent tooth 83 and causes the intermediate member 34 to move axially to the left as shown in FIG. 4(B) against the force of bias spring 36. The shallower inclines of faces 83B and 134B help reduce the resistance to such motion created by bias spring 36 and the return biasing mechanism in the bicycle transmission. After the tip of each detent projection 134 passes the tip of its corresponding detent tooth 83, intermediate member 34 moves to the right, each detent projection 134 enters the space 140 between the next adjacent pair of detent teeth 83, and operating member 18 and operating member detent unit 38 are held stationary relative to base member 14 by the contact between the face 134A of each detent projection and the face 83A of a corresponding detent tooth 83 as shown in FIG. 4(C). In this embodiment, the distance between successive spaces 140 is set such the foregoing operation pulls control wire 26 sufficiently to cause the bicycle transmission to shift by one gear (typically to a lower gear ratio).

FIGS. 5(A)-5(C) show the operation of twist-grip shift control device 10 when releasing transmission control wire 26. In the idle position shown in FIG. 5(A), the face 134A of each detent projection 134 again rests against the face 83A of a corresponding detent tooth 83, and operating member 18 and operating member detent unit 38 are held stationary relative to base member 14. The rider then rotates operating member 18 clockwise in FIG. 1. This time, the face 134A of each detent projection 134 slides against the face 83A of its corresponding detent tooth 83 and causes the intermediate member 34 to move axially to the left as shown in FIG. 5(B) against the force of bias spring 36. After the tip of each detent projection 134 passes the tip of its corresponding detent tooth 83, intermediate member 34 moves to the right, each detent projection 134 enters the space 140 between the next adjacent pair of detent teeth 83, and operating member 18 and operating member detent unit 38 are held stationary relative to base member 14 by the contact between the face 134A of each detent projection and the face 83A of a corresponding detent tooth 83. In this case, control wire 26 is released a sufficient amount to cause the bicycle transmission to shift by one gear in the other direction (typically to a higher gear ratio).

Figure 6:
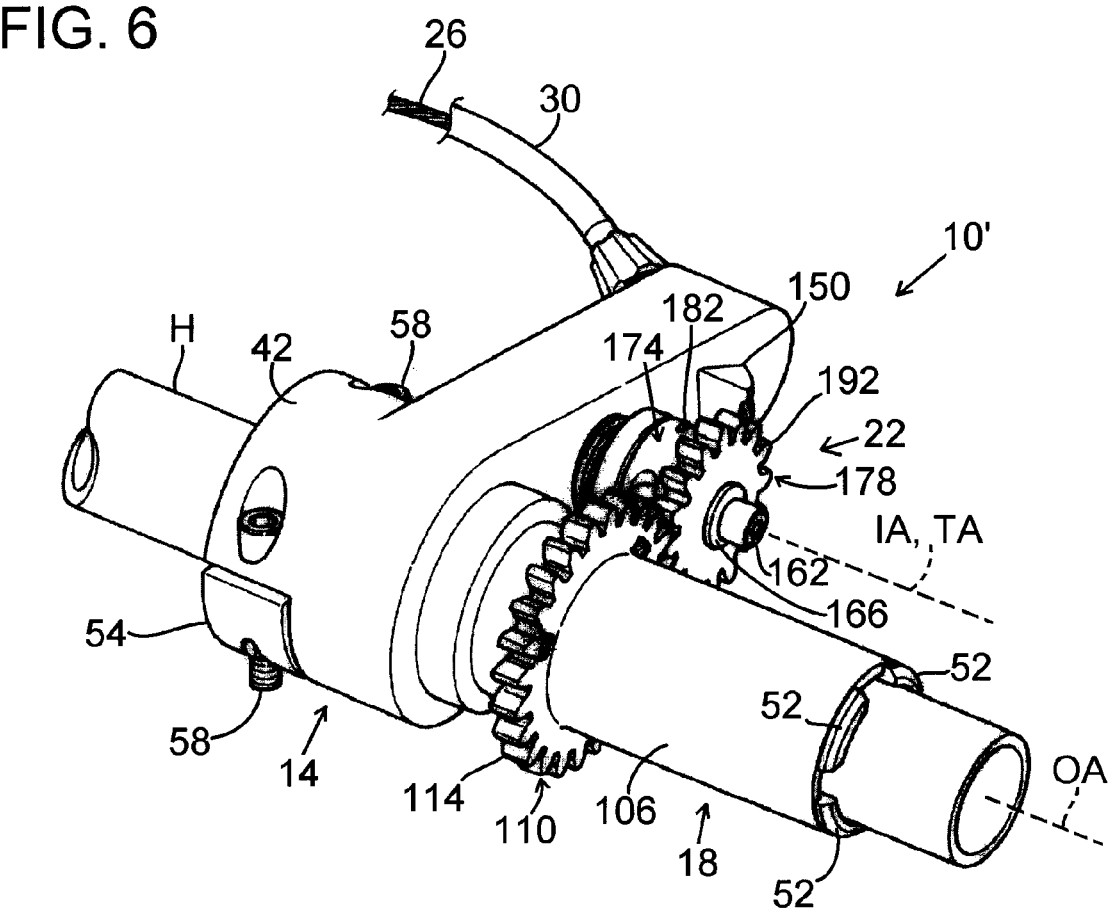
FIG. 6 is an oblique view of another embodiment of a twist-grip shift control device showing relevant operating components.

While the above is a description of various embodiments of inventive features, further modifications may be employed without departing from the spirit and scope of the present invention. For example, FIG. 6 is an oblique view of another embodiment of a twist-grip shift control device 10' showing relevant operating components. This embodiment is very similar to the embodiment shown in FIGS. 1-3 except for the placement of the intermediate member. Accordingly, the components that are the same as the components in the embodiment shown in FIGS. 1-3 are numbered the same, and only the differences will be described here.

Figure 7:
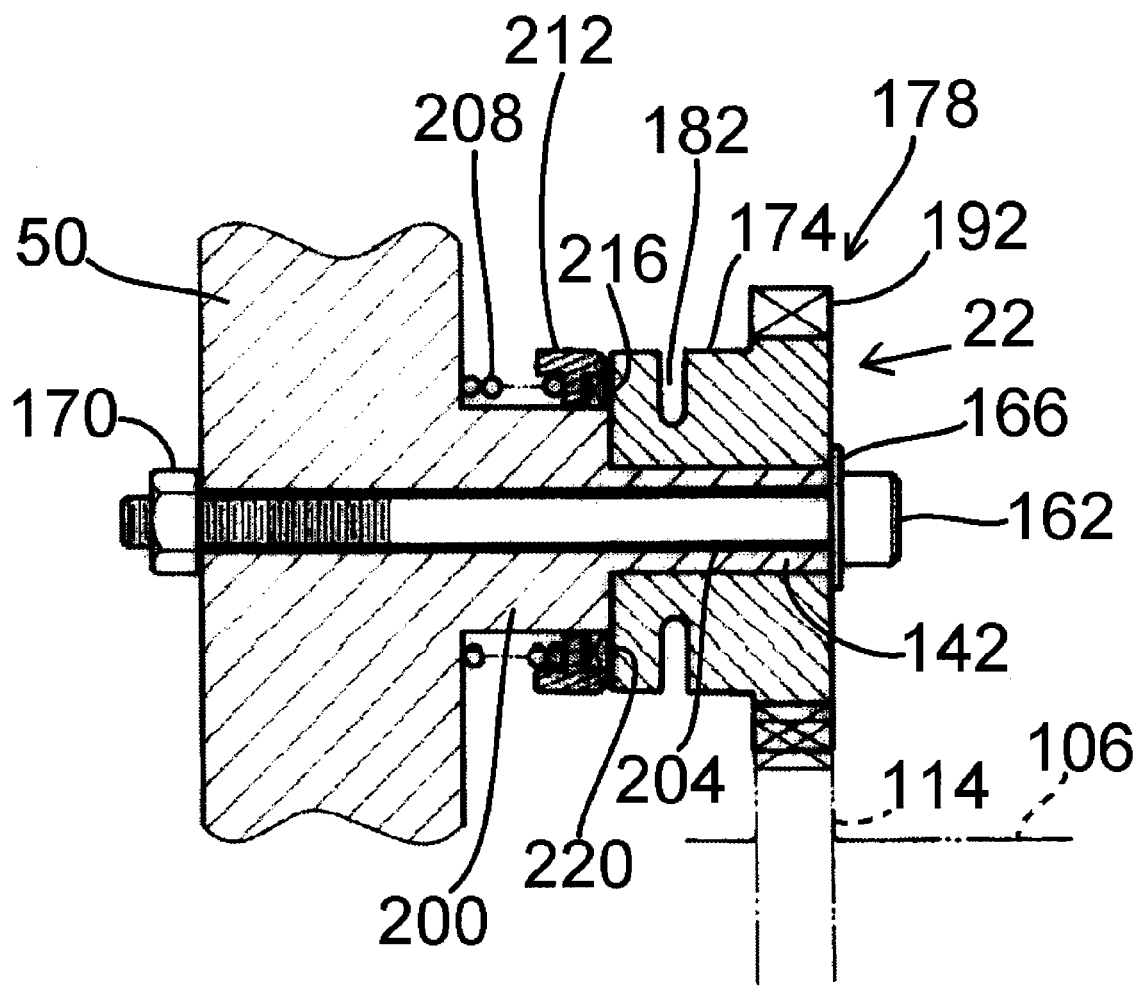
FIG. 7 is a cross sectional view of the bias spring, intermediate member and transmission control member of the twist-grip shift control device shown in FIG. 6.

In this embodiment, intermediate member 34, bias spring 36 and operating member detent unit 38 from the first embodiment are omitted. Instead, as shown in FIG. 7, pivot post 142 includes an intermediate member mounting portion 200 and a transmission control member mounting portion 204. A bias spring 208 and an intermediate member 212 are mounted around intermediate member mounting portion 200. Intermediate member 212 includes guide projections (not shown) that extend from its inner peripheral surface in the same manner as intermediate member 34 in the first embodiment, and such guide projections cooperate with an entry channel, a transition channel and a locking channel (none shown) formed in intermediate member mounting portion 200 in the same manner described for the first embodiment. Intermediate member 212 includes detent teeth 216 (forming an intermediate member detent unit) that engage detent projections 220 (forming a transmission control member detent unit) in the same manner as detent teeth 83 and detent projections 134 in the first embodiment. In this embodiment, detent projections 220 are formed integrally with wire winding drum 174 of takeup control member 22. Bias spring 208 and intermediate member 212 cooperate with transmission control member 22 in the same manner as bias spring 36, intermediate member 34 and operating member detent unit 38 in the first embodiment.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

The invention claimed is:

1. A bicycle twist-grip shift control device comprising:
   a base member for attachment to the bicycle;
   a twist-grip operating member rotatably supported relative to the base member for rotating in first and second directions around an operating member axis;
   a transmission control member rotatably mounted relative to the base member to directly pull and release a transmission control element, wherein the transmission control member rotates around a transmission control member axis that is substantially parallel to the operating member axis in response to rotation of the operating member; and
   an intermediate member that moves in a direction of an intermediate member axis in response to rotation of the operating member, wherein the intermediate member includes an intermediate member detent for maintaining a rotational position of the operating member and the transmission control member;
   wherein the operating member axis is spaced apart from the transmission control member axis.

2. The device according to claim 1 wherein the operating member axis is substantially coaxial with the intermediate member axis.

3. The device according to claim 2 wherein the intermediate member is substantially nonrotatable relative to the base member.

4. The device according to claim 3 wherein the operating member includes a gear portion that meshes with a gear portion of the transmission control member.

5. The device according to claim 4 wherein the operating member includes an operating member detent that engages the intermediate member detent for maintaining the rotational position of the operating member and the transmission control member.

6. The device according to claim 1 wherein the intermediate member axis is substantially coaxial with the transmission control member axis.

7. The device according to claim 6 wherein the intermediate member is substantially nonrotatable relative to the base member.

8. The device according to claim 7 wherein the operating member includes a gear portion that meshes with a gear portion of the transmission control member.

9. The device according to claim 8 wherein the transmission control member includes a transmission control member detent that engages the intermediate member detent for maintaining the rotational position of the operating member and the transmission control member.

10. The device according to claim 1 wherein the intermediate member moves separately from the transmission control member.

11. The device according to claim 10 wherein the intermediate member moves axially relative to both the transmission control member and the operating member.

12. The device according to claim 1 wherein the intermediate member moves axially relative to the transmission control member.

13. The device according to claim 1 wherein the intermediate member moves axially relative to the operating member.

* * * * *